June 7, 1955    C. L. KNOWLES ET AL    2,710,247
TREATMENT OF PHOSPHATE ROCK
Filed Dec. 29, 1950    2 Sheets-Sheet 1

INVENTORS
Chester L. Knowles,
Roman Chelminski
BY
Curtis, Morris & Safford
ATTORNEYS June 7, 1955
C. L. KNOWLES ET AL
2,710,247
TREATMENT OF PHOSPHATE ROCK
Filed Dec. 29, 1950
2 Sheets-Sheet 2
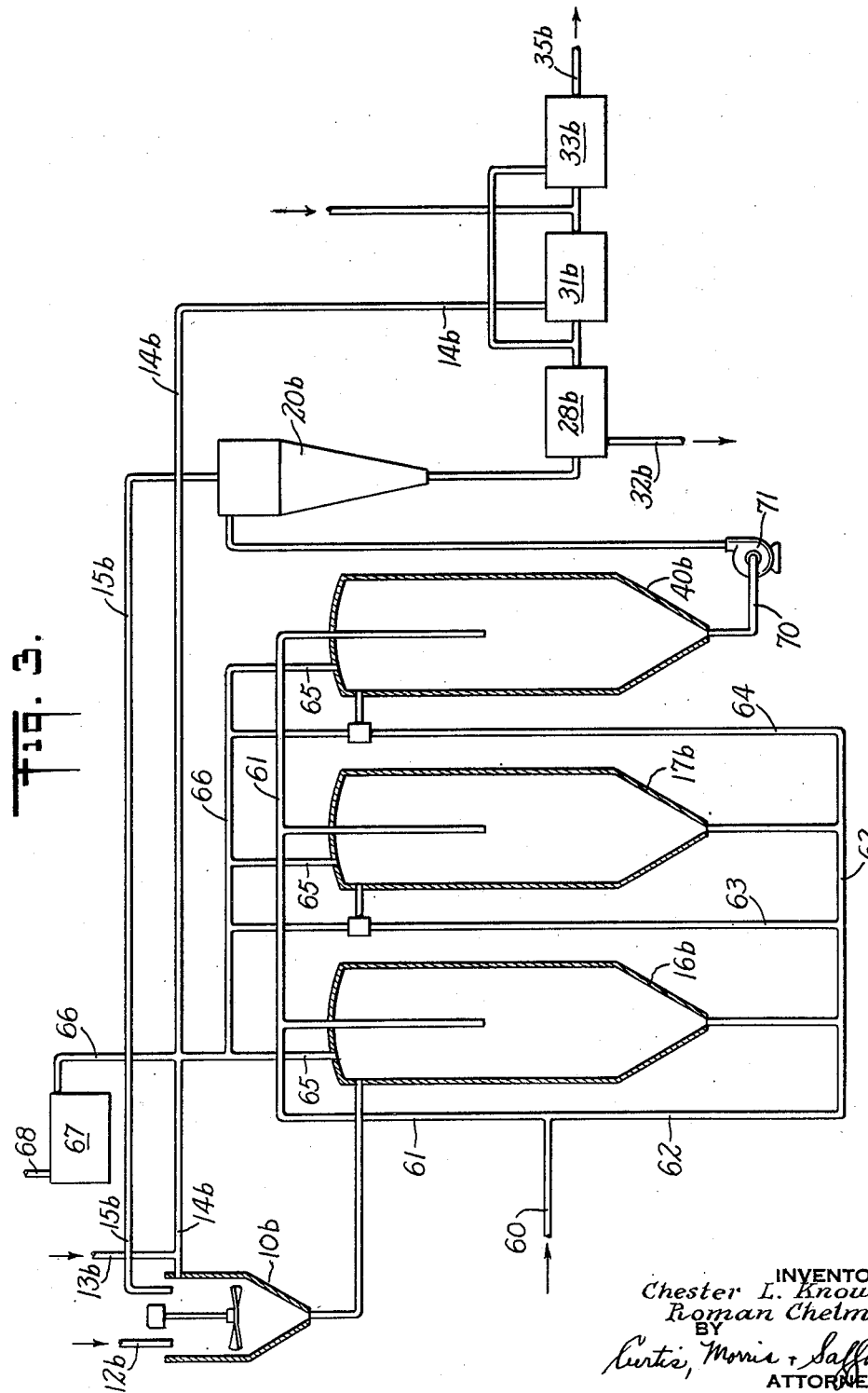
INVENTORS
Chester L. Knowles
Roman Chelminski
BY
ATTORNEYS

2,710,247

TREATMENT OF PHOSPHATE ROCK

Chester L. Knowles, New Rochelle, N. Y., and Roman Chelminski, Wilton, Conn., assignors to Knowles Associates, New York, N. Y., a copartnership Application December 29, 1950, Serial No. 203,424

18 Claims. (Cl. 23—165)

This invention relates to the treatment of phosphate rock with acidic materials to form phosphoric acid.

In treating phosphate rock with sulfuric acid, solid calcium sulfate is precipitated; since it is necessary to separate the precipitated calcium sulfate from the liquor bearing the phosphoric acid, it is necessary to adjust treatment conditions so that the precipitated calcium sulfate is in a form amenable to separation from the liquor. Depending upon ambient conditions, calcium sulfate may crystallize as a dihydrate, $CaSO_4$, $2H_2O$, a hemihydrate, $CaSO_4$, $\tfrac{1}{2}H_2O$ or anhydrite $CaSO_4$. Ordinarily, it has been considered essential in the manufacture of phosphoric acid to keep the conditions such that only the dihydrate is formed; but it has been suggested that the calcium sulfate can be recovered as hemi-hydrate or anhydrite.

In a conventional phosphoric acid process such as is disclosed in U. S. Patent 2,049,032 issued to Weber et al., for example, the reaction temperatures are kept below 80° C., and one is careful to form only dihydrate, but the concentration of the phosphoric acid produced cannot be greater than 32% $P_2O_5$, without encountering serious practical difficulties. In such a process, only a portion of the reaction mixture is passed to a filter, wherein the phosphoric acid liquor is separated from precipitated calcium sulfate. Another relatively large portion (about 85-95%) of the reaction mixture (hereinafter termed recirculated slurry) is returned to the head end of the plant and mixed with the new materials.

It is an object of this invention to improve the efficiency of equipment in the production of phosphoric acid. It is a further object of this invention to increase the efficiency of operation of the process. Still another object of this invention is to produce directly more concentrated phosphoric acid than has been feasible with ordinary commercial processes (e. g., 45% and even stronger) without resort to evaporation. Other objects of this invention will be in part obvious and in part pointed out hereinafter.

In one aspect of this invention, phosphate rock is treated in a reaction zone or zones with sulfuric acid and a recycle suspension of fine seed crystals, from which coarser crystals have been removed. Weak acid wash liquor may be recycled also.

In a specific embodiment of this aspect of the invention the reaction mixture is conducted, after mixing, through a series of open reaction vessels or digester-agitators wherein the temperature is maintained at about 70° to 80° C.; the detention time of the reaction mixture in these reaction vessels is of the order of 3 to 8 hours. From the last of these agitators the reaction mixture is conducted to a slurry classification step which yields a coarse-solids slurry, and a fine solids suspension, the former containing most of the coarse solids and the latter being relatively dilute. This slurry classification step may be carried out in a sedimentation vessel wherein the fine-solids suspension overflows from the top of the vessel and wherein the coarse-solids slurry settles to the bottom where it is collected into a removal conduit by means of a slow raking mechanism. The fine-solids suspension overflowing the hydroseparator is collected and returned to the head end of the system, that is, to the mixing vessel or reaction zone. In a typical procedure the recycled fine-solids suspension contains only about 5% to 10% of solids; the solids therein are fine particles of calcium sulfate dihydrate which function as seed or nuclei particles for the growth of larger crystals. Also, the dilute recycled suspension serves to maintain the desired fluidity of the reaction mixture and thus to facilitate agitation and subsequent separations; an additional advantage is that this dilute recycled suspension effects the necessary dilution of the comminuted phosphate rock with a liquid strong in phosphoric acid and thus gives a more concentrated phosphoric acid product. However, it is to be noted that in this embodiment of the invention, as with prior processes, at the reaction temperatures 70–80° C., the phosphoric acid strength should not exceed about 32% $P_2O_5$ lest unstable, substantially unfilterable forms of calcium sulfate be produced. But according to another feature of the invention, as set forth below, we operate at higher temperatures and readily recover phosphoric acid directly at high concentrations without evaporation.

The coarse-solids slurry removed from the hydroseparator is conducted to a filter or centrifuge wherein the phosphoric acid liquor is separated from the solids. Because of the coarse size of these separated solids, the separation is facilitated, the efficiency of separation is high, and the filter cake is easily washed with relatively small amount of water. The weak phosphoric acid effluent from the washing is collected and supplied to the head end of the system.

The practice of this aspect of the invention permits the production of phosphoric acid of about 32% $P_2O_5$ content with substantially greater output for given equipment such as is conventionally used (or smaller equipment for a given output) without sacrificing either product quality or recovery. We have used this process in conventional plant equipment and, by the practice of this embodiment of the invention, substantially doubled the phosphoric acid output of the plant as compared to the previous operation of the same plant.

Turning now to another aspect of our invention, we have discovered that where strong phosphoric acid, e. g. of the order of 45% $P_2O_5$ content, is desired, it may be produced efficiently by the present invention without the usual costs of evaporation. In this aspect of our invention, we maintain a considerably higher temperature in the reaction zone, specifically above the range in which unstable calcium sulfate hemi-hydrate is formed, e. g. at or about 110° C. when the phosphoric acid concentration is in the range 40–45% $P_2O_5$. In the range 45–50%, 100° C. may be taken as the low limit, although for practical operation the temperature should be about ten degrees higher. The top limit is fixed by practical considerations of convenience and economy of heating, and by boiling points of the mixture. At concentrations below 40% the lower temperature limits increase rapidly, and at concentrations above 45%, the temperature limits decrease more slowly; but ordinarily viscosity will become the limiting factor. Advantageously, in this process the stable, filterable anhydrite form of calcium sulfate is produced. These crystal forms of calcium sulfate and the conditions of their formation have been described in the literature.

An additional advantage of this process is that the detention time of the materials in the reaction zones is materially reduced; and thus the efficiency of plant utilization is raised. Flow conditions may be adjusted so that the detention time is less than 2 hours.

Another feature of this form of our invention is that the water added to the reaction mixture remains as dilution water instead of being taken up as water of crystallization, and thus reduces both the amount of waste material and permits easier washing of acid from the calcium sulfate solids. For example, when operating in the 70°–80° range with 32% phosphoric acid, producing calcium sulfate dihydrate, for every ton of rock treated there is produced approximately 1.66 tons of calcium sulfate dihydrate; however, when operating in the range above 110° C. and 45% concentration, producing calcium sulfate anhydrite, there is only about 1.31 tons of anhydrite per ton of rock treated. Thus a saving is effected of more than 18% by weight of the solids to be handled in this process as compared with conventional dihydrate process. Acid losses are also reduced by the present invention since the loss of acid in the separated solids depends upon surface area and, of course, the increase in average particle size reduces that area and facilitates drainage of acid solution from the filters. The decrease in recirculated solids, and the increase in reaction rates as well as this improvement in recovery all result in greater plant efficiency; that is for a given output of phosphoric acid, smaller equipment may be used, or else a higher throughput obtained from existing equipment.

In this embodiment of the invention more concentrated phosphoric acid product is made feasible, in spite of its greater viscosity by minimizing recycling of precipitated solids which would otherwise thicken the reaction mixture and the reacted slurry.

The classification of the resulting slurry into respectively fine and coarse portions is advantageously effected, according to the present invention, by means of centrifugal force. In this connection, we prefer to employ a so-called Driessen cone, a cyclone device into which the slurry is pumped tangentially and which, by the action of centrifugal force of spiral flow therein, discharges an overflow relatively free of coarse solids but having fine seed crystals in suspension, and an underflow of relatively coarse particles in a thick slurry. The dilute fine suspension is recycled to the head end of the plant, as previously described in connection with the low temperature process; and this recycled suspension serves to dilute the reaction mixture without diluting the strong acid produced in the reaction. The strong acid is ultimately separated from the coarse slurry by a filtration or centrifuging step, as described above, or by more intense centrifuging.

In producing strong phosphoric acid according to this procedure, it is to be noted that the reaction zone is maintained at a temperature slightly below the boiling point of the phosphoric acid. This permits operation of the process in open vessels, and at atmospheric pressure, without the danger of excessive loss of strong acid by evaporation.

However, to obviate need for close temperature control in the various zones, one may operate in closed reaction vessels at a pressure above atmospheric and at reaction temperatures above the normal boiling temperature of the strong acid produced. For example, one may operate at between 120° and 125° C., with 45% $P_2O_5$, thus operating well in the region of temperature and acid concentration wherein stable calcium sulfate anhydrite is produced. In so doing, it may be necessary to supply heat in addition to that generated in the reaction zone by the materials themselves, but this added cost of operation is recompensed by the accelerated reaction rates obtained by the high temperature operation.

As will be more fully brought out in connection with the description of the drawings, the practice of this invention is not limited to mechanical agitation. Thus, one may use air agitation in the reaction zone in order to avoid moving mechanical parts which have a relatively short life due to abrasive and corrosive conditions. Similarly, air lifts may replace pumps. However, since air agitation tends to promote the formation of foam, we employ a foam breaker in this case. This may comprise a high speed disc rotating in a closed tank wherein the incoming foam impinges against the central part of the rotating disc; this causes the foam to be thrown against the walls of the tank at high velocity thereby breaking up the air bubbles and converting the feed to normal liquid or slurry.

An additional feature of this invention relates to the production of concentrated phosphoric acid which is to be used in the manufacture of triple superphosphate. Since the acid made by our process is of sufficient strength to permit its use without further concentration by evaporation, and since one is not faced with the limitations of evaporators, it will not be necessary to completely free the product acid from contaminating calcium sulfate (although a clear acid has been used in the past because evaporator limitations require it). Assuming that a small percentage of calcium sulfate in the product acid used for triple superphosphate manufacture is not objectionable, one can avoid the use of a filtration step by substituting therefor treatment in a centrifuge such as a solid bowl centrifuge. Since absolutely clear acid is not needed for the production of triple superphosphate small and economical centrifuges may be employed in practicing this embodiment of the invention. If desired more than one centrifuge may be used in series, that is, the separated solids may be washed, separated and if desired, re-washed and recovered.

Although in this specification and the accompanying drawings we are showing and describing particular examples and various modifications thereof, it should be understood that these are not intended to be exhaustive or limiting of the invention, but on the contrary are chosen and presented for purposes of illustration and in order to explain the principles of the invention and the practical employment of those principles in applying the invention to practical use, and thus so fully to instruct others skilled in this art that they will be enabled readily to modify and to select and substitute alternatives, each as may be best suited to the particular conditions of any given application or use.

The features of this invention will be appreciated more fully by reference to the accompanying drawings wherein:

Fig. 3 is a diagrammatic flow sheet depicting a closed treating system suitable for producing any desired concentration of phosphoric acid, at atmospheric or super atmospheric pressure wherein air lifts and air agitation replace mechanical transfer and agitation of the materials within the digestion-agitation zone.

Figure 1:
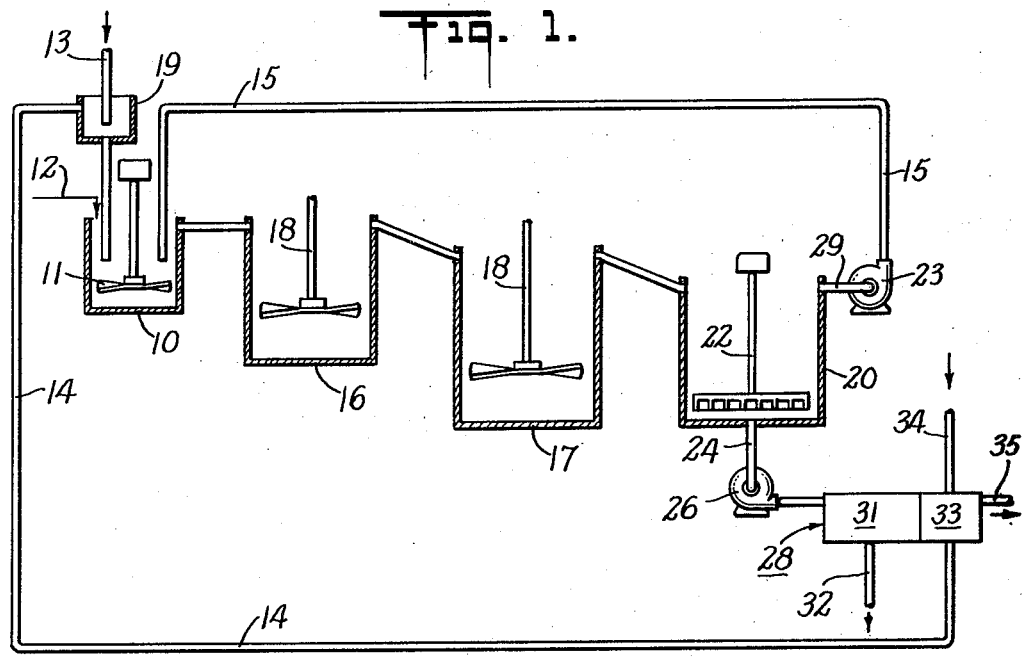
Fig. 1 is a diagrammatic flow sheet depicting a procedure suitable for forming phosphoric acid.

Referring particularly in the drawings to Fig. 1, there is shown one example of the carrying out of the invention. A mixer 10, having an agitator 11, receives comminuted phosphate rock by a conveyor 12, sulfuric acid via conduit 13, recycle weak wash liquor through conduit 14 and recycled hydroseparation overflow liquor by conduit 15.

The sulfuric acid and recycled phosphoric acids may begin to act on the phosphate rock in the mixer 10, but the residence time in mixer 10 is relatively short, of the order of a few minutes. The slurry in mixer 10 overflows therefrom and passes successively to the digesters 16 and 17 which have agitators 18.

These digester vessels are considerably larger than the mixer 10 and consequently the residence time of the slurry is considerably greater than that maintained in the mixer 10, e. g. about 3 to 8 hours. During this period while the materials are in the indicated reaction zones 10, 16, 17, the rock is reacted upon by the sulfuric acid and heat is evolved.

The temperature is maintained throughout the reaction zones below that at which the calcium sulfate is precipitated in unstable hemihydrate crystal form. A practical operating temperature for this embodiment of the invention is 70 to 80° C. or less if the $P_2O_5$ concentration is about 32%. In general, the weaker the phosphoric acid concentration, the higher the temperature may be maintained up to about 100° C. at 15% and 105° C. at 5% $P_2O_5$.

The slurry from the second digester 17 overflows to a hydroseparator 20. As shown, the hydroseparator is of a known type having a slow raking mechanism 22 so that coarser settled solids may be raked to the center of the bottom and removed as a thick slurry of coarse gypsum crystals via conduit 24 and underflow pump 26 to a slurry filter 28. Fine seed crystals in dilute suspension (5–10% solids) overflow from the hydroseparator through conduit 29 and are passed by pump 23 to mixer 10 via conduit 15.

The slurry filter 28 is shown diagrammatically as having a filtration zone 31 from which product is discharged as filtrate acid solution at 32, and a washing zone 33 which is supplied with wash water from pipe 34 and yields a calcium sulfate cake 35 and weak acid liquor, which is recycled via conduit 14 to receiving tank 19. Sulfuric acid is supplied to tank 19 through conduit 13. This invention is not limited to any particular type rock, nor to use of the specific types of hydroseparators, mixers, reaction vessels, etc.

Figure 2:
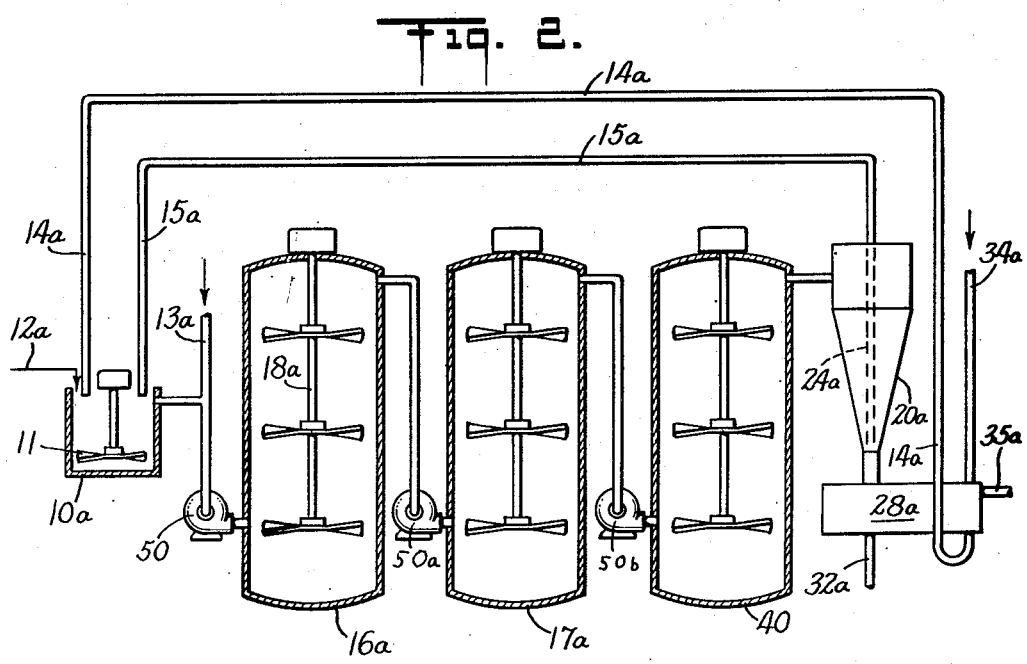
Fig. 2 is a diagrammatic flow sheet depicting a procedure involving operation under pressure, e. g., for producing more concentrated phosphoric acid, as well as acid of ordinary strength.

In Fig. 2 is illustrated a closed digestion procedure which is particularly suited for forming more concentrated phosphoric acid. Finely-divided phosphate rock is conducted to a closed mixer 10a via conduit 12a; mixer 10a has a mixing mechanism 11. Also supplied to mixer 10a are weak recycle liquor through conduit 14a and recycle seed crystal suspension through conduit 15a. The mixed slurry leaves mixer 10a and is combined with sulfuric acid supplied through conduit 13a and then is supplied to a lower portion of closed digester 16a by means of pump 50. Digester 16a has an agitator 18a to keep the ground rock and precipitated calcium sulfate in suspension; the other digesters 17a and 40 are similarly equipped. Partially digested slurry under pressure leaves digester 16a and passes successively through closed pressure digesters 17a and 40, passing from the latter to a hydroseparation or solids classification step; this is shown as being effected by a cyclonic type hydroseparator 20a.

The total digestion time in digestors 16a, 17a, and 40 is maintained at around one to four hours; the temperature in the digestion zone or zones is maintained in the range which yields stable, easily filterable calcium sulfate crystals. Under the conditions set forth above a suitable temperature for this purpose is 110° C. While this temperature may, in general, be lower, the higher the phosphoric acid content of the mother liquor, we find it most advantageous to maintain the liquor concentration at about 45% concentration (calculated as $P_2O_5$) and the reaction temperature at about the normal boiling point of the phosphoric acid. The elevated temperature is advantageously maintained throughout the process to the point at which separated calcium sulfate is discharged.

The classification or separation apparatus is shown at 20a as hydrocyclonic; and, as shown, the slurry enters an upper side portion of an elongated cone having a tail pipe 24a, the coarser solids pass to the lower portion of the cone and are conducted therefrom to filter 28a. We find that the so-called Driessen type cone, i. e. a cone having a ratio of length to maximum diameter of about 7:1, is most advantageous for this separation. The upper effluent from the hydrocyclonic separator 20a is comprised of fine calcium sulfate crystals and strong acid liquor; this is shown as passing back to mixer 10a. Filter 28a separates the solids of the coarser slurry from the strong acid; these solids are discharged at 35a, after being washed with water from conduit 34a. The weak acid wash liquor is recycled to mixer 10a via conduit 14a. Strong acid product is discharged as filtrate solution from the filter 28a at 32a.

By merely raising the temperature in this example above the range of hemi-hydrate formation (e. g. above 110° C. for 45% $P_2O_5$ concentration in solution) the $CaSO_4$ is kept in anhydrite form. This we have found to produce an unexpected advantage in the present invention first because these crystals are more readily separated by gravity or centrifugal force, and secondly, because the same amount of $CaSO_4$ as anhydrite crystals has less volume and less surface area; and therefore, with a given phosphoric acid concentration, produces less thickening and thus permits operation with higher acid concentrations in the slurries. Since 45% acid boils at something like 118° C. it is still possible to operate in open vessels at 115° C. at which the stable anhydrite forms; but it is entirely possible to use closed vessels and super atmospheric pressure.

Using this embodiment of the invention the time required in the digestors may be reduced e. g. to 2 hours.

Though we have shown the separation at 20a as effected by a hydrocyclonic separator, it is to be noted that other types of separators, such as centrifuges may be used. This is important in the present embodiment because the strong phosphoric acid is quite viscous (specific gravity 1.8 for example) making a simple sedimentation as shown in Fig. 1 relatively slow.

Fig. 3 is a flowsheet of a procedure suitable for producing strong phosphoric acid wherein the digestion-agitation zones are maintained at superatmospheric pressure and wherein pneumatic agitation and conveying of the materials is used. Otherwise, the flow of materials and conditions are similar to what has been described previously in connection with Fig. 2. Thus, phosphate rock, sulfuric acid, recycle strong acid liquor bearing fine seed crystals of calcium sulfate, and recycle weak acid liquor enter mixing vessel 10b through conduits 12b, 13b, 15b and 14b, respectively. From vessel 10b the materials enter successively the closed reaction vessels or Pachuca tanks 16b, 17b and 40b, in which the reacting materials are agitated by compressed air supplied by conduit systems 60 and 61. Materials are transferred from vessel 16b to 17b and from 17b to 40b by air lifts, i. e. compressed air from conduit 60 and header 62 enters standpipe conduits 63 and 64 at points below the bottoms of said vessels and causes the air-slurry mixture to rise in the standpipe conduits by gravity.

In order to allow for the agitating flow of air from the system 60—61, air or other gas is released from the Pachuca tanks and conducted by conduits 65 and header conduit 66 whence it flows into foam breaker 67 and is discharged therefrom to the atmosphere or to vapor treating apparatus while collected liquid flows back to the reaction vessels or the mixing zone, e. g. through pipe 68.

The slurry leaving vessel 40b by conduit 70 is transferred via pump 71 to the upper portion of hydrocyclonic separator or Driessen cone 20b. Thence, effluent strong liquor bearing fine seed crystals is recycled via conduit 15b to mixing vessel 10b. The underflow slurry from separator 20b, which comprises strong acid liquor and coarse particles is conducted to filters and/or centrifuges 28b, 31b and 33b. Therefrom, strong phosphoric acid product is discharged at 32b and calcium sulfate at 35b, wash water is supplied between filters 31b and 33b and reused in 31b for further washing and then is conducted to the mixer 10b, whereby its acid content is retained in the system.

Having now particularly pointed out and described embodiments of our invention, what we claim is:

1. The method of producing phosphoric acid which comprises supplying solid phosphatic material to a reaction zone, also supplying thereto sulfuric acid and recycled fine solids suspension bearing fine particles of calcium sulfate, agitating the mixture of materials in the reaction zone, passing the resulting mixture from the reaction zone to a classification zone, separating the mixture into a relatively dilute fine-solids suspension, and a more concentrated coarse-solids slurry, recycling said fine-solids suspension to the reaction zone, and separating a liquid component from the coarse-solids slurry.

2. The method according to claim 1 wherein said separation into coarse-solids slurry and fine-solids suspension is conducted by gravity settling.

3. The method according to claim 1 wherein said separation into coarse-solids slurry and fine-solids suspension is, at least in part, centrifugal.

4. The method of producing phosphoric acid which comprises reacting phosphate rock and sulfuric acid in the presence of recycled suspension of seed crystals, agitating such materials in the reaction zone, maintaining the reaction zone at a temperature lying between about 70° C. and 80° C., conducting materials from said reaction zone to a first separation zone and separating the materials into a relatively dilute suspension of fine-solids and a coarse-solids slurry, recycling said fine-solids to the reaction zone, and separating said coarse-solids slurry into respective liquid and solid components in a second separation zone.

5. The method of producing phosphoric acid which comprises mixing finely divided phosphate rock, sulfuric acid and recycle suspension of fine particles of calcium sulfate, then conducting said materials to a reaction zone, agitating said materials at a temperature about 70°–80° C. until reaction is substantially complete, subjecting said materials therefrom to a hydroseparation thereby yielding a fine-solids suspension and a coarse-solids slurry, recycling fine-solids suspension to the mixing vessel, and separating the coarse-solids slurry into liquid phosphoric acid and solid calcium sulfate.

6. The method of producing strong phosphoric acid which comprises mixing phosphate rock and sulfuric acid and recycle suspension of fine calcium sulfate seed crystals, then reacting said materials while agitating them and maintaining temperatures outside the range of formation of unstable calcium sulfate hemihydrate, separating centrifugally materials from the reaction into a fine-solids suspension and a coarse-solids slurry respectively, by rotary flow along a spiral path, recycling said fine-solids suspension to the reaction zone, and separating the coarse-solids slurry substantially into its respective liquid and solid components.

7. The method according to claim 6 wherein said reaction zone is maintained at a temperature above the range of unstable hemihydrate formation.

8. The method of producing concentrated phosphoric acid which comprises supplying phosphate rock, sulfuric acid and recycle fine-solids suspension containing particles of calcium-sulfate anhydrite to a reaction zone, agitating materials in said reaction zone, conducting materials from the reaction zone to a first separation zone; then separating said materials into a fine-solids suspension and a coarse-solids slurry, recycling said fine-solids suspension to said reaction zone, and then separating said coarse-solids slurry into its respective strong phosphoric acid liquor and solid components in a second separation zone, maintaining said reaction zone, said separation zone, and the intermediate conducting streams, at temperatures above the range of calcium sulfate hemihydrate.

9. The method according to claim 8 wherein said reaction zone is maintained at a temperature above about 112° C., and the reaction zone, the separation zones and the conducting streams are maintained under pressure above the vapor pressure of the phosphoric acid therein.

10. The method according to claim 8 wherein said reaction zone is maintained at a temperature close to the boiling point of the phosphoric acid therein.

11. The method according to claim 8 wherein said first separation is comprised at least in part of hydrocyclonic separation.

12. The method according to claim 11 wherein the second separation is centrifugal without filtration.

13. The method of producing strong phosphoric acid which comprises supplying solid phosphate rock and sulfuric acid and recycle fine-solids suspension containing particles of calcium sulfate to a reaction zone, maintaining said reaction zone at an elevated temperature and at superatmospheric pressure, agitating materials in said reaction zone with compressed gas injection, conducting materials from said reaction zone to another zone and there subjecting them to a hydrocyclonic separation into a fine-solids suspension and a coarse-solids slurry, recycling said fine solids suspension to the reaction zone, and then subjecting the coarse-solids slurry to more intense centrifugal separation.

14. The method of producing concentrated phosphoric acid which comprises supplying phosphate rock, sulfuric acid and recycle fine-solids suspension containing particles of calcium sulfate anhydrite to a reaction zone; agitating materials in said reaction zone; conducting materials from the reaction zone to a first separation zone; separating materials in said first separation zone by gravity settling into a fine-solids suspension and a coarse-solids slurry; recycling said fine-solids suspension to said reaction zone; separating said coarse-solids slurry into respective strong phosphoric acid liquor and solid components in a second separation zone; and maintaining said reaction zone, said separation zones and the intermediate conducting streams at temperatures above the range of calcium sulfate hemihydrate.

15. The method according to claim 14 wherein said reaction zone is maintained at a temperature above 112° C.

16. The method according to claim 14 wherein said reaction zone, said separation zones and the conducting streams are maintained under pressure which pressure is above the vapor of the phosphoric acid therein.

17. The method according to claim 14 wherein said reaction zone is maintained at a temperature approximating that of the boiling point of the phosphoric acid therein.

18. The method according to claim 14 wherein materials in said reaction zone are agitated by injecting compressed gas therein.

References Cited in the file of this patent

UNITED STATES PATENTS

| Re. 19,045 | Larsson | Jan. 16, 1934 |
| 1,851,179 | Hechenbleikner | Mar. 29, 1932 |
| 2,049,032 | Weber et al. | July 28, 1936 |
| 2,164,986 | Cox et al. | July 4, 1939 |
| 2,448,126 | Shoeld | Aug. 31, 1948 |

FOREIGN PATENTS

| 313,036 | Great Britain | July 4, 1929 |
| 309,023 | Great Britain | Jan. 16, 1930 |
| 453,582 | Great Britain | Dec. 5, 1934 |